US006232396B1

United States Patent
Dong et al.

(10) Patent No.: US 6,232,396 B1
(45) Date of Patent: May 15, 2001

(54) EMULSION POLYMERIZATION PROCESS

(75) Inventors: Stephen Dong, Clifton Park; Frank J. Traver, Troy; James F. Warrenchak, Albany, all of NY (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/360,684

(22) Filed: Jul. 26, 1999

(51) Int. Cl.$^7$ ........................................ C08L 83/04
(52) U.S. Cl. ........................... 524/837; 524/588; 528/33; 556/459; 556/469; 424/401
(58) Field of Search .................. 424/401; 524/837, 524/588; 528/33; 556/459, 469

(56) References Cited

U.S. PATENT DOCUMENTS

| 4,066,594 | | 1/1978 | Moeller . |
| 4,476,282 | * | 10/1984 | Koerner et al. . |
| 5,504,149 | | 4/1996 | Kosal . |
| 6,093,410 | * | 7/2000 | Peffly et al. . |

FOREIGN PATENT DOCUMENTS

| 0 874 017 A2 | 10/1998 | (EP) . |
| 9278626 | 10/1997 | (JP) . |

* cited by examiner

Primary Examiner—Robert Dawson
Assistant Examiner—Kuo-Liang Peng

(57) ABSTRACT

A method for preparing a silicone emulsion, more particularly a method for preparing a silicone emulsion with a low cyclic siloxane level and particle size control.

12 Claims, No Drawings

EMULSION POLYMERIZATION PROCESS

TECHNICAL FIELD

The present invention is directed to an emulsion polymerization process, more particularly, to an emulsion polymerization process that allows for control of the level of cyclic siloxanes and the particle size.

BACKGROUND

Current emulsion polymerization processes have cyclic siloxane levels greater than one percent in the final emulsion. With a lower cyclic siloxane level, final product formulations can be better controlled.

Cyclic siloxane contaminants are undesirable from the perspective of health and safety, and there are regulations on the allowed levels in products. Additionally, cyclic siloxanes have a tendency to lower the viscosity of shampoos.

Emulsion polymerization processes have been previously reported, but prior art processes utilized either cyclic siloxanes or mixtures of cyclic and linear siloxanes, and these processes cannot produce emulsions with low cyclic siloxane levels. See, for example, U.S. Pat. No. 5,504,149, which utilizes cyclic siloxanes, surfactant and an initiator that is a silanolate or an organosilanolate; U.S. Pat. No. 4,066,594, which uses cyclic siloxanes and benzene sulfonic acid and optionally a platinum catalyst; EPA 874017, which uses a metal containing catalyst for a chain extension reaction; and JP 9278626, which uses a catalyst and heat for the emulsion polymerization. When cyclic siloxanes are used, the emulsion must be heated to allow polymerization and then cooled for condensation, and the final polymer viscosity is a function of the condensation temperature.

A process is needed in which the particle size of the emulsion can be controlled, as well as the viscosity and the level of cyclic siloxanes in the emulsion. It has been discovered that by using a neutral surfactant system instead of an acid catalyst surfactant during homogenization, particle size, viscosity and cyclic siloxanes can be controlled. A benefit is that with the lower cyclic siloxane level, a safer product can be produced.

SUMMARY OF THE INVENTION

In a first aspect, the present invention is directed to a process for making a silicone emulsion comprising:

a) preparing a neutral aqueous surfactant by adding to water an anionic surfactant and a base, and mixing to form a uniform neutral aqueous surfactant having a pH of about 7;

b) forming a mixture of approximately equal portions of the surfactant and a polysiloxane;

c) homogenizing the mixture to form an emulsion, wherein the emulsion is homogenized until a desired particle size is achieved;

d) cooling the homogenized emulsion;

e) adding an acid to the cooled emulsion and condensing the emulsion to form a polymer, wherein the polymer is condensed until the viscosity reaches the desired level; and f) neutralizing the condensed emulsion with an effective amount of a neutralizing agent wherein the level of cyclic siloxanes in the emulsion is less than one percent by weight.

In a second aspect, the present invention is directed to an emulsion that is used in personal care applications comprising the silicone produced by the process of the present invention.

The process of the present invention is effective in controlling the particle size and the viscosity of the emulsion as well as controlling the level of cyclic siloxanes at a level of less than one percent. Another advantage of the present invention is that the emulsion does not need to be heated for polymerization to take place.

DETAILED DESCRIPTION OF THE INVENTION

In a preferred embodiment, from about 0.3 to 5.0, more preferably from about 0.8 to about 3.0, even more preferably from about 0.9 to about 1.8 parts by weight ("pbw"), of an anionic surfactant and from about 0.06 to about 1.1, more preferably from about 0.2 to about 0.7, even more preferably from about 0.2 to about 0.35 pbw of a base are added to a vessel containing from about 30 to about 90, more preferably from about 35 to about 70, even more preferably from about 40 to about 55 pbw deionized water to form a mixture. In a preferred embodiment, this mixture is then metered with approximately from 8 to about 65, more preferably from about 25 to about 65, even more preferably from about 45 to about 55 pbw of a polysiloxane. In a preferred embodiment, the mixture is then blended by passing the mixture through a paste disperser, such as for example, Premier, and then by milling the mixture, by for example, a colloid mill such as IKA or Gaulin. After blending, the mixture is then fed to a homogenizer, such as a Gaulin, Bran & Lubbe, or a microfluidizer by Microfluidics, to form an emulsion. In a preferred embodiment, the mixture is homogenized, preferably without the addition of heat, at a pressure of from about 4,000 to 12,000 psig, more preferably at a pressure of from about 5,000 to about 8,000, even more preferably at a pressure of about 6000 psig, and a recycle loop is utilized to set the desired particle size and to ensure stability of the emulsion. In a preferred embodiment, the particle size ranges from about 0.1 to about 2.0, more preferably from about 0.2 to about 1.0, even more preferably from about 0.3 to about 0.6 microns, as measured by a Malvern Mastercizer or a Nicomp 170. Once homogenized, the emulsion is fed to a condensation vessel where it is cooled to about 15 to 50° C., more preferably, from about 20 to 35° C., even more preferably to about 20 to 25° C., and from about 0.09 to about 1.5, more preferably from about 0.25 to about 0.9, even more preferably from about 0.29 to about 0.45 pbw of a strong acid is added to bring the pH of the emulsion to about 2, more preferably less than 2. Once the emulsion is acidified, a controlled condensation begins. Once the condensation is complete and the desired polymer viscosity has been achieved, preferably between 100,000 centipoise (cps) and 6,000,000 cps, more preferably between 500,000 and 3,000,000 cps, even more preferably between 1,000,000 and 2,000,000 cps, the emulsion is neutralized to prevent further condensation. In a preferred embodiment, the pH is from about 6 to about 8.5, more preferably from about 6.5 to about 8, even more preferably from about 7 to about 7.5 with a neutralizing agent.

Anionic surfactants suitable for use in the present invention are those that emulsify and provide good condensation. Examples of suitable surfactants include alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid, more preferably dodecylbenzenesulfonic acid. Additionally, co-surfactants, such as sodium lauryl sulfate, may also be used.

In a preferred embodiment, the base of the present invention is one that will neutralize the anionic surfactant.

Examples of bases suitable for use in the present include, but are not limited to, sodium carbonate, sodium hydroxide, potassium hydroxide, calcium carbonate. Preferably, the base is sodium carbonate.

Compounds suitable as the polysiloxane intermediate of the present invention are those that are hydrolyzates. Examples of polysiloxane intermediates that may be used in the present invention include, but are not limited to, linear silanol-stopped polyorganosiloxanes. Preferably, the polysiloxane intermediate of the present invention is a low viscosity silanol-stopped polymer of the formula:

wherein each R is independently a monovalent hydrocarbon radical;
and x is an integer, wherein x is chosen such that the viscosity is from about 15 to about 1000 centistokes, more preferably from about 50 to about 500 centistokes, and even more preferably from about 70 to about 150 centistokes.

Suitable monovalent hydrocarbon groups include acyclic hydrocarbon radicals, monovalent alicyclic hydrocarbon radicals, monovalent and aromatic hydrocarbon radicals. Preferred monovalent hydrocarbon radicals are monovalent $(C_1-C_6)$alkyl radicals, monovalent aryl radicals and monovalent aralkyl radicals.

As used herein, the term "$(C_1-C_6)$alkyl" means a linear or branched alkyl group containing from 1 to 6 carbons per group, such as, for example, methyl, ethyl, propyl, isopropyl, n-butyl, iso-butyl, sec-butyl, tert-butyl, pentyl, and hexyl, preferably methyl.

In a preferred embodiment, the monovalent hydrocarbon radical is a monovalent $(C_1-C_6)$alkyl radical, most preferably, methyl.

As used herein, the term "aryl" means a monovalent unsaturated hydrocarbon ring system containing one or more aromatic rings per group, which may optionally be substituted on the one or more aromatic rings, preferably with one or more $(C_1-C_6)$alkyl groups and which, in the case of two or more rings, may be fused rings, including for example, phenyl, 2,4,6-trimethylphenyl, 2-isopropylmethylphenyl, 1-pentalenyl, naphthyl, and anthryl, preferably phenyl.

As used herein, the term "aralkyl" means an aryl derivative of an alkyl group, preferably a $(C_2-C_6)$alkyl group, wherein the alkyl portion of the aryl derivative may, optionally, be interrupted by an oxygen atom, such as, for example, phenylethyl, phenylpropyl, 2-(1-naphthyl)ethyl, preferably phenylpropyl, phenyoxypropyl, and biphenyloxypropyl.

Suitable intermediate polysiloxanes are made by known methods, such as, for example, hydrolysis, and are commercially available.

In a preferred embodiment, the acid of the present invention is one that is a strong acid that will neutralize the base to form a salt and free up the alkylbenzenesulfonic acid. Examples of acids suitable for use in the present invention include, but are not limited to, nitric acid, hydrochloric acid, formic acid, phosphoric acid and sulfuric acid. Preferably the acid is sulfuric acid.

In a preferred embodiment, the neutralizing agent of the present invention is any base that will raise the final pH to about 6 to about 8.5, preferably from about 6.5 to about 8, more preferably from about 7 to about 7.5. Examples of neutralizing agents suitable for use in the present invention include, but are not limited to, alkanolamines of the formula:

wherein $R^1$ is a divalent $(C_1-C_8)$alkyl radical. Preferably, the neutralizing agent is triethanolamine.

The process of the present invention may optionally contain additional components, such as, for example, biocides, antifoam agents, fragrances, colorants, preservatives and any other additives known in the art.

In a preferred embodiment, the process of the present invention further comprises adding minor amount, preferably, less than 1% by weight of the composition, and, more preferably, less than 0.5% by weight of the composition, a biocide. Suitable biocides include microbiocides such as Proxel GXL microbiocide, commercial available from Zeneca, and Kathon CG +IP II microbiocide, commercially available from Rohm & Haas. Preferably, the biocide is Kathon CG+IP II.

The emulsions are useful in personal care applications such as shampoos, conditioners, lotions, cosmetics, etc. The emulsion is generally incorporated into a personal care product in an amount of about 0.01 to about 50 weight percent, more preferably 0.1 to 20 weight percent, of the total personal care composition. The personal care composition of the present invention may, optionally, further contain such known components as, for example, emollients, moisturizers, humectants, pigments, colorants, fragrances, biocides, preservatives, exfoliants, hormones, enzymes, medicinal compounds, anti-microbial agents, anti-fungal agents, vitamins, electrolytes, alcohols, polyols, surfactants, emulsifiers, silicone oils, organic oils, waxes, suspending agents, thickening agents and water.

The following example illustrates the process of the present invention. It is illustrative and the claims are not to be construed as limited to the example.

EXAMPLE

Four batches of emulsion were prepared using the process of the present invention. Results of the batches are shown in the tables below. The batches were produced as follows:

To a suitable vessel, 44.87 parts by weight of deionized water were charged, and an agitator started at moderate speed. To the water, about 1.2 parts by weight of dodecylbenzenesulfonic acid was added to make an aqueous solution. Approximately 0.26 parts by weight of sodium carbonate were added to neutralize the acid. The mixture was blended until the solution pH was approximately 7 (about 20 minutes). This solution was then proportionately metered into another vessel (in about equal parts) with about 52 parts by weight of a polysiloxane (silanol-stopped low viscosity polymer, approximately 100 cps). The mixture was then passed through a Premier paste disperser and milled through a Bran and Lubbe colloid mill. The emulsion stream was then fed to a surge tank to feed the homogenizer.

The emulsion was fed to the homogenizer (about 6000 psig) at a rate equivalent to about two passes to set the particle size of the emulsion and to ensure product stability. Homogenized emulsion was then transferred to a condensation tank. Once filled, the condensation tank is cooled in line to an appropriate temperature between 20 and 35° C. To the cooled emulsion, about 0.35 parts by weight of concentrated sulfuric acid was added, bringing the pH of the emulsion to less than 2. The condensation proceeded until the viscosity of the polymer was about 1,500,000 to 1,600,000 cps.

Once the condensation was completed, the emulsion was neutralized with about 1.2 parts of 85% aqueous triethanolamine. A biocide (Kathon II) was added (0.1% by weight). Optionally, an antifoam agent may be added to control foaming during the operation. If necessary, the completed emulsion is adjusted with water to control the solids content. The emulsion is then filtered into a final container.

TABLE 1

Physical Properties

|  | Batch 1 | Batch 2 | Batch 3 | Batch 4 | Comp. 1 | Comp. 2 |
|---|---|---|---|---|---|---|
| Gradient-Dilute % | 1.05 | 1.05 | 1.44 | 1.13 | — | — |
| Gradient-Straight % | 4 | 0.4 | 2.83 | 3.51 | .78 | .83 |
| Polymer Visc. (cps) | 1641000 | 1639000 | 1620000 | 1550000 | 1790000 | 1700000 |
| % Cyclic Siloxanes | 0.34 | 0.31 | 0.30 | 0.35 | 0.98 | 2.47 |
| Particle Size D50 (microns) | 0.36 | 0.41 | 0.42 | 0.42 | 0.48 | 0.35 |
| Particle Size D90 (microns) | 0.70 | 0.77 | 0.80 | 0.80 | 0.93 | 0.71 |
| Emulsion Visc. (cps) | 30 | 30 | 40 | 40 | — | 120 |
| % Solids | 50.6 | 50.5 | 50.5 | 50.4 | — | 50.5 |
| pH | 7.62 | 7.35 | 7.14 | 7.16 | — | — |

Comparative Example 1 — existing technology of prior art using acid;
Comparative Example 2 — competitive emulsion

TABLE 2

Polymer Viscosity vs. Time during Condensation

| Time (Hours) | Batch 1 Viscosity (cps) | Batch 2 Viscosity (cps) | Batch 3 Viscosity (cps) | Batch 4 Viscosity (cps) |
|---|---|---|---|---|
| 1 | 692 | 1,416 | 889 | — |
| 2 | 2,045 | 4,876 | — | 9,751 |
| 3 | 7,471 | 26,895 | 33,737 | — |
| 4 | 35,545 | 83,044 | — | 103,000 |
| 5 | 95,941 | 189,260 | — | 117,803 |
| 6 | 227,663 | 455,488 | 255,837 | 251,648 |
| 7 | 511,964 | 651,139 | 710,000 | 718,000 |
| 8 | 780,109 | 1,130,843 | 1,140,000 | 1,110,000 |
| 9 | 1,228,357 | 1,639,644 | 1,620,000 | 1,550,000 |
| 10 | 1,640,657 | — | — | — |

TABLE 3

Cyclic Siloxane Levels at Various Condensation Temperatures after about 11 hours

| Temperature °C. | % Cyclic Siloxane |
|---|---|
| 6 | 0.11 |
| 18 | 0.25 |
| 25 | 0.33 |
| 30 | 0.51 |
| 35 | 0.58 |
| 40 | 0.79 |
| 45 | 1.05 |
| 53 | 1.69 |

TABLE 4

% Cyclic Siloxane and Viscosity vs. Condensation Temp. & Time

| Temp. °C. | Time (hours) | % Cyclic Siloxane | Viscosity (cps) |
|---|---|---|---|
| 6 | 11.5 | 0.11 | 87,605 |
| 6 | 20.7 | 0.15 | 1,727,459 |
| 18 | 10.9 | 0.22 | — |
| 18 | 16.9 | 0.27 | 2,830,000 |
| 25 | 7 | 0.2 | — |
| 25 | 9.5 | 0.26 | 817,856 |
| 30 | 7.6 | 0.38 | — |
| 30 | 12 | 0.54 | 1,118,000 |
| 35 | 8.9 | 0.47 | — |
| 35 | 12.4 | 0.58 | 801,000 |
| 40 | 6.5 | 0.54 | — |
| 40 | 11.3 | 0.79 | 458,471 |
| 45 | 13.5 | 1.05 | 334,220 |

What is claimed is:

1. A process for making a silicone emulsion comprising:
    a) preparing a neutral aqueous surfactant by adding to water an anionic surfactant and a base, and mixing to form a uniform neutral aqueous surfactant having a pH of about 7;
    b) forming a mixture of approximately equal portions of the surfactant and a polysiloxane;
    c) homogenizing the mixture to form an emulsion, wherein the emulsion is homogenized until a desired particle size is achieved;
    d) cooling the homogenized emulsion;
    e) adding an acid to the cooled emulsion and condensing the emulsion to form a polymer, wherein the polymer is condensed until the viscosity reaches the desired level; and
    f) neutralizing the condensed emulsion with an effective amount of a neutralizing agent
    wherein the level of cyclic siloxanes in the emulsion is less than one percent by weight.

2. The process of claim 1, comprising:
    i) from about 0.3 to about 5 pbw of an anionic surfactant, from about 0.06 to about 1.1 pbw of a base and from about 30 to about 90 pbw water;
    ii) from about 8 to about 65 pbw of a polysiloxane;
    iii) from about 0.09 to about 1.5 pbw of an acid;
    iv) an effective amount of a neutralizing agent to neutralize the emulsion to a pH of from about 6 to 8.5.

3. The process of claim 1, wherein the mixture is homogenized at a pressure of from about 4,000 to about 12,000 psig.

4. The process of claim 1, wherein the emulsion is cooled after homogenization to from about 15 to about 50° C.

5. The process of claim 1, wherein the polymer viscosity is from about 100,000 to about 6,000,000 cps.

6. The process of claim 2, wherein the anionic surfactant is alkylbenzenesulfonic acid.

7. The process of claim 6, wherein the anionic surfactant is dodecylbenzenesulfonic acid.

8. The process of claim 1, wherein the polysiloxane is a low viscosity silanol-stopped polymer of the formula:

$$HO\text{—}(R_2SiO)_x\text{—}H$$

wherein each R is independently a monovalent hydrocarbon radical;
and x is an integer, wherein x is chosen such that the viscosity is from about 15 to about 1000 centistokes.

9. The process of claim 8, wherein each R is methyl.

10. The process of claim 1, wherein the neutralizing agent is an alkanolamine of the formula:

$$(R^1OH)_3N$$

wherein $R^1$ is $(C_1\text{–}C_8)$alkyl.

11. The process of claim 10, wherein the neutralizing agent is triethanolamine.

12. The process of claim 1, wherein the particle size of the emulsion is from about 0.1 to about 2.0 microns.

* * * * *